United States Patent
Momose (10) Patent No.: US 10,824,827 B2
(45) Date of Patent: Nov. 3, 2020

(54) CARD READER AND CONTROL METHOD THEREOF

(71) Applicant: NIDEC SANKYO CORPORATION, Nagano (JP)

(72) Inventor: Munemasa Momose, Nagano (JP)

(73) Assignee: NIDEC SANKYO COPRORATION, Nagano (JP)

( * ) Notice: Subject to any disclaimer, the term of this patent is extended or adjusted under 35 U.S.C. 154(b) by 0 days.

(21) Appl. No.: 16/438,931

(22) Filed: Jun. 12, 2019

(65) Prior Publication Data
US 2019/0384949 A1    Dec. 19, 2019

(30) Foreign Application Priority Data
Jun. 18, 2018  (JP) ................. 2018-115612

(51) Int. Cl.
*G06K 7/10*      (2006.01)
*G06K 13/08*     (2006.01)

(52) U.S. Cl.
CPC ..... *G06K 7/10207* (2013.01); *G06K 7/10217* (2013.01); *G06K 7/10267* (2013.01); *G06K 13/0875* (2013.01)

(58) Field of Classification Search
CPC .......... G06K 7/10207; G06K 7/10217; G06K 7/10267; G06K 13/0875

USPC ........................................................ 235/380
See application file for complete search history.

(56) References Cited

U.S. PATENT DOCUMENTS

| | | | | |
|---|---|---|---|---|
| 5,988,708 A | * | 11/1999 | Frolov | G07C 9/00674 292/92 |
| 6,659,343 B2 | * | 12/2003 | Tanaka | G06K 1/14 235/380 |
| 7,708,195 B2 | * | 5/2010 | Yoshida | G06F 13/4239 235/380 |
| 2005/0248088 A1 | * | 11/2005 | Yoshida | G06K 7/10 273/149 R |
| 2011/0042465 A1 | * | 2/2011 | Smets | G06K 7/0008 235/492 |
| 2015/0213334 A1 | * | 7/2015 | Ishikawa | G06K 13/0875 235/449 |
| 2019/0384949 A1 | * | 12/2019 | Momose | G06K 7/10267 |

FOREIGN PATENT DOCUMENTS

JP              05025704 U       4/1993

* cited by examiner

*Primary Examiner* — Michael G Lee
*Assistant Examiner* — David Tardif
(74) *Attorney, Agent, or Firm* — Cantor Colburn LLP (57) ABSTRACT

A card reader which reads information recorded on a card may include a plurality of units having overlapping operation periods; and a control unit structured to operate each of the plurality of units by a plurality of drive powers. The control unit may be configured to control the plurality of units so that periods in which the drive powers of each of the plurality of units are maximum do not overlap.

11 Claims, 6 Drawing Sheets

CARD READER AND CONTROL METHOD THEREOF

CROSS REFERENCE TO RELATED APPLICATION

The present application claims priority under 35 U.S.C. § 119 to Japanese Application No. 2018-115612 filed Jun. 18, 2018, the entire content of which is incorporated herein by reference.

BACKGROUND

Field of the Invention

At least an embodiment of the present invention relates to a card reader for reading data recorded on a card and recording data onto the card, and a control method thereof.

Description of the Related Documents

Card readers for reading magnetic data recorded on a card and recording magnetic data onto the card have been used widely. The card reader is provided with a shutter driving unit which drives a shutter member for closing a card conveyance path, a roller driving unit for driving a conveyance roller for the card, and an interference magnetic field generation unit as a measure against skimming, and the like. JP-A-5-25704 discloses a shutter driving unit which uses a solenoid.

The card reader has a plurality of units which consume a large amount of power such as the shutter driving unit, the roller driving unit, and the interference magnetic field generation unit. When a plurality of these units are operated simultaneously, and the power consumption of each unit peaks at the same time, the maximum power consumption of the card reader will become large.

It is the object of at least an embodiment of the present invention, in consideration of the aforementioned circumstances, to provide a card reader which can suppress the increase of the instantaneous power consumption, and a control method thereof.

SUMMARY

The card reader of at least an embodiment of the present invention is a card reader which reads information recorded on a card, and includes a plurality of units having overlapping operation periods and a control unit which operates each of the plurality of units at a plurality of drive powers, wherein the control unit controls the plurality of units so that the periods in which the drive powers of the plurality of units are maximum do not overlap.

A control method of the card reader of at least an embodiment of the present invention is a control method of the card reader which reads information recorded on the card, and includes a control step of operating, at a plurality of drive powers, each of a plurality of units mounted on the card reader and having overlapping operation periods, wherein the control step controls the plurality of units so that the periods in which the drive powers of the plurality of units are maximum do not overlap.

At least an embodiment of the present invention can provide a card reader which can suppress the increase of the instantaneous power consumption, and a control method thereof.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION (Configuration of Card Reader)

Figure 1:
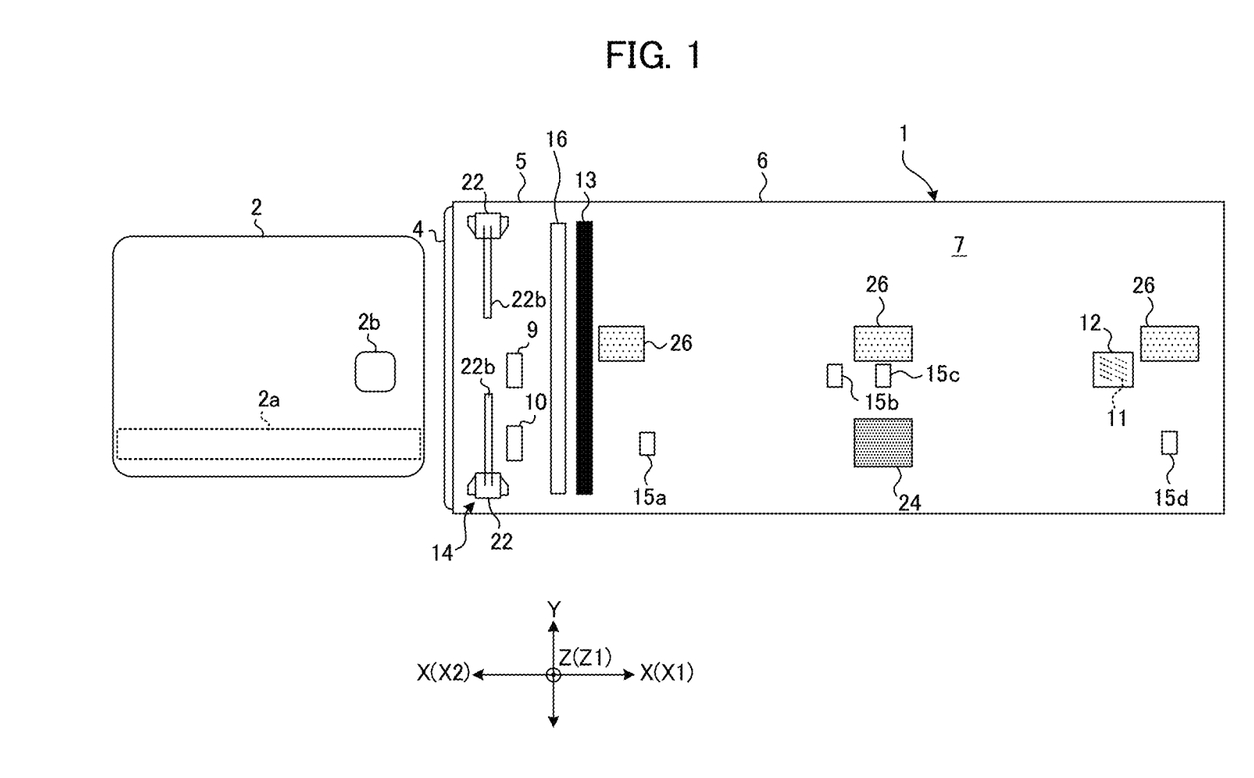
FIG. 1 is a plan view describing the configuration of a card reader 1 according to an embodiment of the card reader of the present invention.
Figure 2:
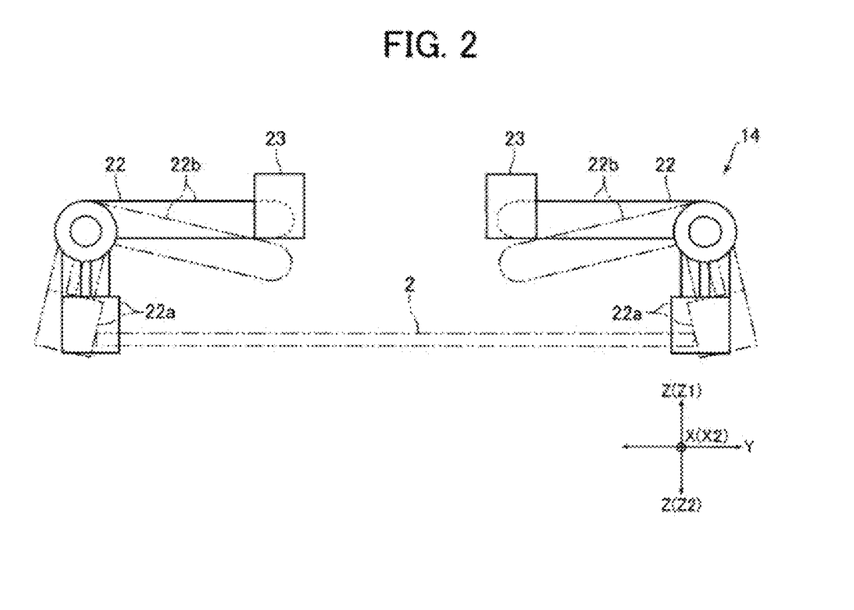
FIG. 2 is a front view describing the configuration of a card insertion detection mechanism 14 shown in FIG. 1.
Figure 3:
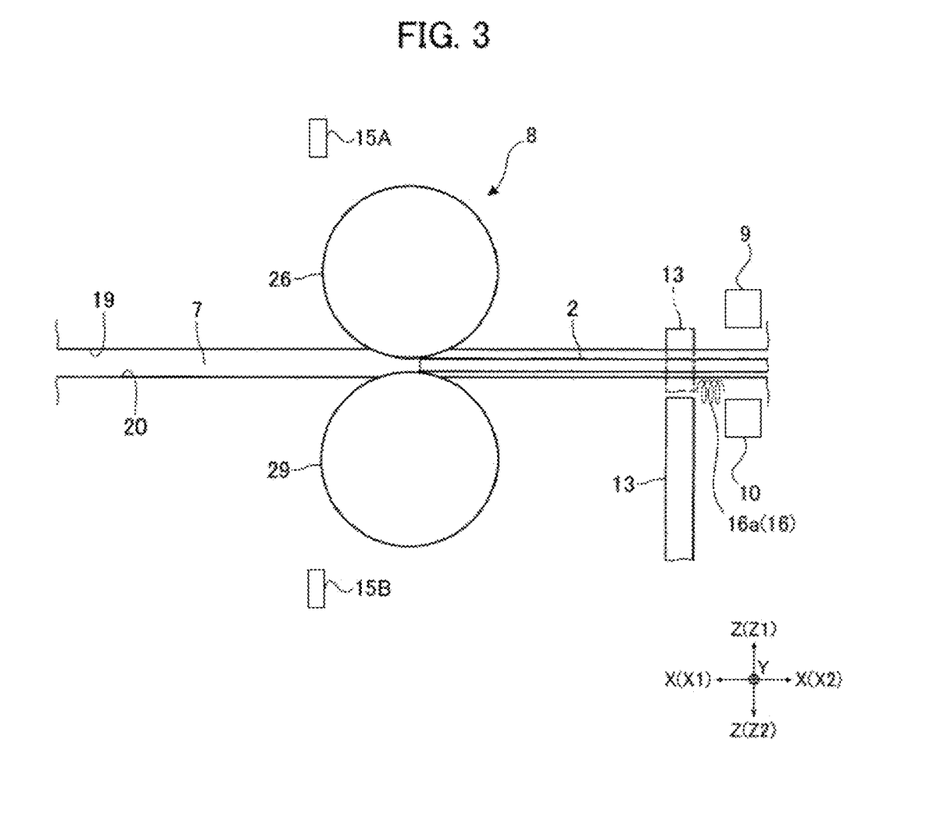
FIG. 3 is a side view describing the configuration of a prehead 10, an IC chip sensor 9, an interference magnetic field generation device 16, a card detection mechanism 15a, and a conveyance roller 26 shown in FIG. 1.
Figure 4:
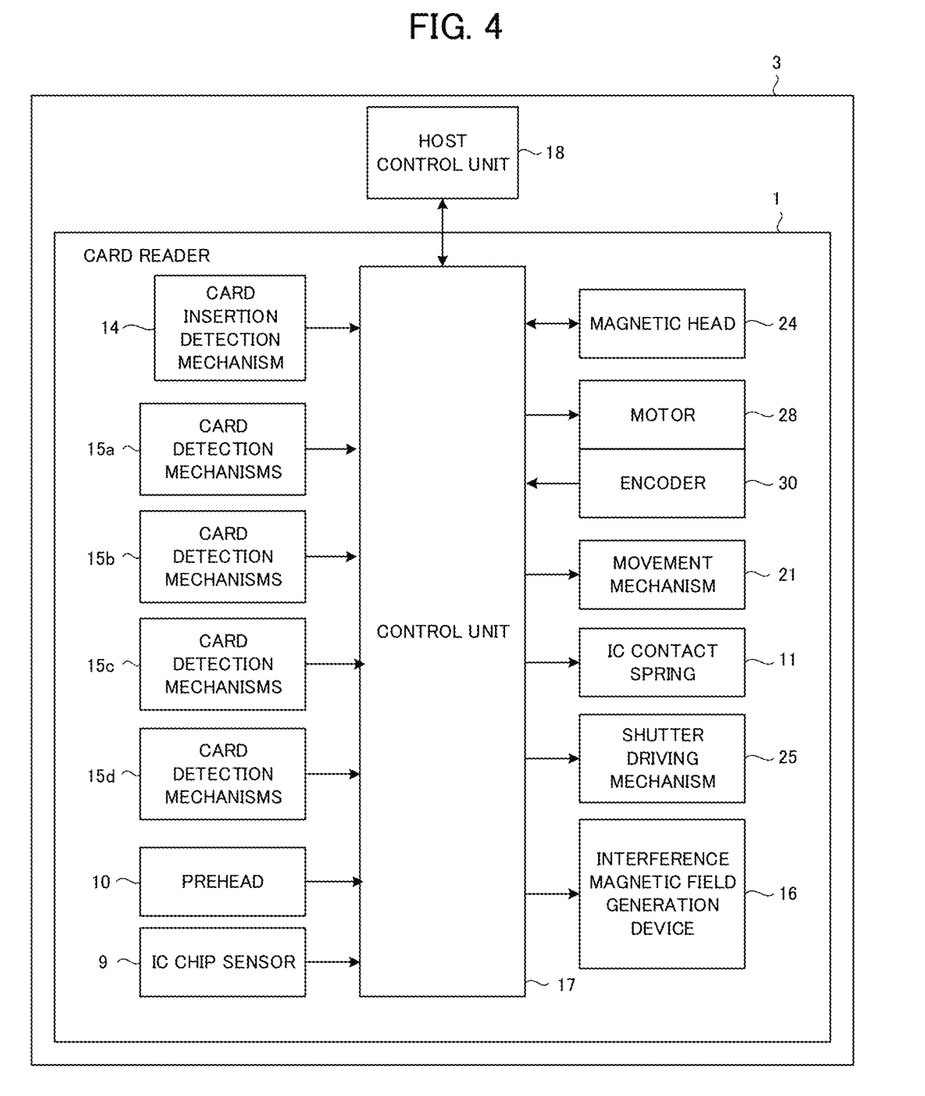
FIG. 4 is a block diagram of a host device 3 on which the card reader 1 shown in FIG. 1 is mounted and the card reader 1.

FIG. 1 is a plan view describing the configuration of a card reader 1 according to an embodiment of the card reader of the present invention. FIG. 2 is a front view describing the configuration of a card insertion detection mechanism 14 shown in FIG. 1. FIG. 3 is a side view describing the configuration of a prehead 10, an IC chip sensor 9, an interference magnetic field generation device 16, a card detection mechanism 15a, and a conveyance roller 26 shown in FIG. 1. FIG. 4 is a block diagram of a host device 3 on which the card reader 1 shown in FIG. 1 is mounted and the card reader 1.

The card reader 1 is a device for reading data recorded on a card 2 and recording data into the card 2, and is used by mounting on a host device 3 (refer to FIG. 4) such as an Automated Teller Machine (ATM). As shown in FIG. 1, the card reader 1 includes a card insertion unit 5 in which an insertion port 4 for inserting a card 2 is formed, and a main body part 6. A card conveyance path 7 in which the card 2 which is inserted into the insertion port 4 is conveyed is formed on the inside of the main body part 6 of the card reader 1, and the card reader 1 includes a card conveyance mechanism 8 (Refer to FIG. 3) which conveys the card 2 on the card conveyance path 7.

The card reader 1 conveys the card 2 in the X direction shown in FIG. 1 and the like. Further, the card 2 is inserted in the X1 direction and ejected in the X2 direction of FIG. 1 and the like. Namely, the X1 direction is the insertion direction of the card 2 into the insertion port 4, and the X2 direction is the ejection direction of the card 2 from the injection port 4. Further, the Z direction in FIG. 1 and the like, which is orthogonal to the X direction is the thickness direction of the card 2 inserted in the insertion port 4, and the Y direction in FIG. 1 and the like, which is orthogonal to the X direction and the Z direction is the width direction of the card 2. In the following description, the X direction is the front and rear direction, the Y direction is the right and left direction, and the Z direction is the vertical direction. Further, the side (X2 direction side) on which the insertion port 4 is formed in the front and rear direction is a "front" side, and the opposite side (X1 direction side) is a "rear (back)" side. Further, one side (Z1 direction side) in the vertical direction is an "upper" side, and the opposite side (Z2 direction side) is a "lower" side.

The card 2 is, for example, a rectangular-shaped card made of vinyl chloride and having a thickness in the range of 0.7 mm to 0.8 mm. Further, the card 2 is a contact type IC card with a magnetic stripe as prescribed by International Standard (ISO/IEC7811) or Japanese Industrial Standards JIS (JISX6302). As shown in FIG. 1, a magnetic stripe in which magnetic data is to be recorded is formed on the back face (bottom surface) of the card 2. Further, an IC chip may be incorporated in the card 2, and an external connection terminal 2b of the IC chip is formed on the front side (upper side) of the card 2. The magnetic stripe 2a and the external connection terminal 2b are formed in a predetermined position prescribed by the international standards or JIS standards.

The card reader 1 comprises a magnetic head 24 for performing at least one of reading magnetic data recorded on a magnetic stripe 2a or recording magnetic data onto the magnetic stripe 2a (refer to FIG. 1), and an IC contact block 12 having a plurality of IC contact springs 11 in contact with the external connection terminal 2b of the card 2 on the inside of the main body part 6.

Further, the card reader 1 comprises a shutter member 13 for closing the card conveyance path 7, a card insertion detection mechanism 14 for detecting that a card 2 has been inserted in the insertion port 4, a prehead 10, an IC chip sensor 9, an interference magnetic field generation device 16, card detection mechanisms 15a, 15b, 15c and 15d for detecting the presence of a card 2 in the card conveyance path 7 and a control unit 17 for controlling the card reader 1. The control unit 17 is connected to a host control unit 18 which is the control unit of the host device 3 (refer to FIG. 4).

The card insertion unit 5 is connected to the front end of the main body part 6. The card conveyance path 7, as shown in FIG. 3, includes an upper guide member 19 constituting the upper surface of the card conveyance path 7 and a lower guide member 20 constituting the lower surface of the card conveyance path 7. The upper guide member 19 and the lower guide member 20 are made of an insulating resin material. As shown in FIG. 1, the magnetic head 24 and the IC contact block 12 are disposed on the inside of the main body part 6. The magnetic head 24 is disposed so that a gap part of the magnetic head 24 faces the card conveyance path 7 from the lower side. The IC contact block 12 is disposed on the rear side relative to the magnetic head 24. Further, the IC contact block 12 is disposed so as to face the card conveyance path 7 from the upper side. The magnetic head 24 is electrically connected to the control unit 17 (refer to FIG. 4). Note that, the IC contact block 12 may be configured to be disposed in front of the magnetic head 24 (for example, between the second conveyance roller 26 and the first conveyance roller 26 counting from the side closer to shutter member 13).

The movement mechanism 21 (refer to FIG. 4) which moves the IC contact block 12 between a contactable position in which the IC contact spring 11 can be in contact with the external connection terminal 2b of the card 2 and a retreated position retreated (specifically, retreating to the upper side) so that the IC contact spring 11 is not in contact with the external connection terminal 2b of the card 2 is connected to the IC contact block 12. The movement mechanism 21 includes a drive source such as a solenoid, and a power transmission mechanism such as a link mechanism for transmitting the power of the drive source to the IC contact block 12. The movement mechanism 21 is connected to the control unit 17. Specifically, the drive source of the movement mechanism 21 is electrically connected to the control unit 17. The IC contact spring 11 is electrically connected to the control unit 17. The control unit 17 supplies current to the IC contact spring 11. Examples of the movement mechanism 21 include the configuration described in WO 2018/61685, the configuration described in WO 2016/158946, or the configuration which moves using a cam groove.

The card insertion detection mechanism 14 is disposed on the rear side of the insertion port 4, and detects the card 2 inserted in the insertion port 4. The card insertion detection mechanism 14 detects that the card 2 is inserted into the insertion port 4 by detecting the width (width in the right and left direction) of the card 2 inserted in the insertion port 4. As shown in FIG. 2, this card insertion detection mechanism 14 includes two lever members 22 respectively disposed on both sides in the right and left direction and two sensors 23. The card insertion detection mechanism 14 is disposed in a front end side portion of the card insertion unit 5. Further, card insertion detection mechanism 14 is electrically connected to the control unit 17. Specifically, the two sensors 23 are electrically connected to the control unit 17. The sensor 23 is a transmission type optical sensor having a light emitting element and a light receiving element disposed so as to face each other. The sensor 23 is disposed on the upper side of the card conveyance path 7 so that the light emitting unit and the light receiving unit face each other in the front and rear direction. Note that, in FIG. 1, the illustration of the sensor 23 has been omitted.

The lever member 22 is formed so that the shape as viewed from the front and rear direction is substantially L-shaped, and is constituted from card contact parts 22a respectively disposed on both end sides of the card conveyance path 7 in the right and left direction, and a light intercepting parts 22b extending from the upper end of the card contact part 22a to the inside in the right and left direction. This lever member 22 is rotatably held by a frame of the card insertion unit 5, so as to make it possible to have a center of rotation at the boundary between the card contact part 22a and the light intercepting parts 22b and rotation in the front and rear direction as the axis of rotation. The light intercepting parts 22b are disposed on the upper side of the card conveyance path 7. Further, the lever member 22 is biased by a spring member which is not shown so that the lower end side of the card contact part 22a is disposed in the card conveyance path 7.

During the standby mode prior to the card 2 being inserted into the insertion port 4, as shown by the solid line of FIG. 2, the lower end side of the card contact part 22a is disposed in the card conveyance path 7, and the two respective light intercepting parts 22b intercept between the light emitting unit of sensor 23 and the light receiving unit. At this time, the card insertion detection mechanism 14 is in an OFF state. In this state, when the card 2 in which the width of the short-side direction is a predetermined width is inserted in the insertion port 4, as shown by the two-dot chain line of FIG. 2, both the left and right ends of the card 2 contact with the lower end side of the two respective card contact parts 22a to rotate the two lever members 22 until the two respective light intercepting parts 22b are separated from the light emitting unit of the sensor 23 and the light receiving unit. If the two respective light intercepting parts 22b are separated from the light emitting unit of the two sensors 23 and the light receiving unit, the card insertion detection mechanism 14 is in the ON state.

On the one hand, the width of the card 2 inserted in the insertion port 4 is narrower than the predetermined width, thus, when the light intercepting parts 22b are not separated from between the light emitting unit of sensor 23 of at least one of the two sensors 23 and the light receiving unit, the card insertion detection mechanism 14 remains in the OFF state. Therefore, the card insertion detection mechanism 14 detects a card 2 by switching from an OFF state to an ON state when the width in the right and left direction of the card 2 inserted in the insertion port 4 is a predetermined width. Note that, during the standby mode prior to the card 2 being inserted into the insertion port 4, by separating the two respective light intercepting parts 22b between the light emitting unit of the sensor 23 and the light receiving unit, the card insertion detection mechanism 14 may be in an OFF state. In this case, when a card 2 having a predetermined width is inserted in the insertion port 4, and the space between the light emitting unit of the sensor 23 and the light receiving unit is intercepted by the two respective light intercepting parts 22b, the card insertion detection mechanism 14 is in the ON state. The configuration of the card insertion detection mechanism 14 is not limited to that shown in FIG. 2. For example, the card contact part 22a may be disposed to only one side in the width direction of the card, and the other side may be a side surface of the conveyance path of the card. In this case, by setting the distance between the card contact part 22a and the side surface of the conveyance path of the card to a predetermined width (slightly narrower than the width of the card), the insertion will be detected when the card is inserted.

The shutter member 13 is disposed in the boundary portion between the card insertion unit 5 and the main body part 6, in other words, the rear end side of the card insertion unit 5. The shutter driving mechanism 25 (refer to FIG. 4) is connected to the shutter member 13. The shutter driving mechanism 25 includes a drive source such as a solenoid, and a power transmission mechanism such as a link mechanism for transmitting the power of the drive source to the shutter member 13.

The shutter driving mechanism 25 is connected to the control unit 17. Specifically, the drive source of the shutter driving mechanism 25 is electrically connected to the control unit 17.

The shutter member 13 is capable of moving between a closed position (position illustrated by the two-dot chain line of FIG. 3) which closes the card conveyance path 7 and an open position (position illustrated by the solid line of FIG. 3) which retreats from the card conveyance path 7 to open the card conveyance path 7.

The prehead 10 is a magnetic head for detecting whether or not the desired magnetic data determined in accordance with the standards has been recorded on the magnetic stripe 2a of the card 2 inserted from the insertion port 4. The prehead 10 is disposed between the card insertion detection mechanism 14 and the shutter member 13 in the card insertion unit 5, and detects magnetism from the position where the magnetic stripe 2a of the card 2 inserted in the insertion port 4 is to be formed. The prehead 10 functions as a magnetic detector. The prehead 10 is disposed in the right and left direction in almost the same position as the magnetic head 24 in the main body part 6. As shown in FIG. 3, the prehead 10 is disposed so that the gap part of the prehead 10 faces to the card 2 inserted in the insertion port 4 from the lower side.

The IC chip sensor 9 is a sensor for detecting whether or not an IC chip has been mounted on the card 2 inserted from the insertion port 4. Specifically, the IC chip sensor 9 is a metal sensor for detecting the metal contained on the external connection terminal 2b of the card 2 inserted from the insertion port 4. The IC chip sensor 9 is disposed in the card insertion unit 5 between the card insertion detection mechanism 14 and the shutter member 13, and detects the metal from the position where the external connection terminal 2b of the card 2 inserted in the insertion port 4 is to be formed. The IC chip sensor 9 functions as a metal detector.

The IC chip sensor 9 is in the same position in the front and rear direction as the prehead 10, and is disposed in the right and left direction in almost the same position as the IC contact block 12 in the main body part 6. As shown in FIG. 3, the IC chip sensor 9 is disposed so as to face the card 2 inserted in the insertion port 4 from the upper side.

The interference magnetic field generation device 16 is provided between the prehead 10 and the IC chip sensor 9 and the shutter member 13. The interference magnetic field generation device 16 generates an interference magnetic field in the vicinity of the card insertion unit 5. As shown in FIG. 3, the interference magnetic field generation device 16 includes a coil 16a which is the generation source of the interference magnetic field. The interference magnetic field generation device 16 generates or stops the interference magnetic field by switching the power of the coil 16a ON or OFF. The interference magnetic field generation device 16 generates the interference magnetic field which does not affect the magnetic information recorded on the card 2. The interference magnetic field generation device 16 is connected to the control unit 17. Specifically, the coil 16a is electrically connected to the control unit 17.

The card detection mechanisms 15a, 15b, 15c and 15d are disposed on the inside of the main body part 6. Namely, the card detection mechanisms 15a, 15b, 15c and 15d are disposed on the rear side relative to the card insertion detection mechanism 14, the prehead 10 and the IC chip sensor 9. Further, the card detection mechanisms 15a, 15b, 15c and 15d are respectively disposed in a state shifted in the front and rear direction. The card detection mechanism 15b is disposed on the rear side relative to the card detection mechanism 15a, the card detection mechanism 15c is disposed on the rear side relative to the card detection mechanism 15b, and the card detection mechanism 15d is disposed on the rear side relative to the card detection mechanism 15c. As shown in FIG. 4, the card detection mechanisms 15a, 15b, 15c and 15d are electrically connected to the control unit 17. Further, as shown in FIG. 3, the card detection mechanisms 15a, 15b, 15c and 15d are transmission type optical sensors each having a light emitting unit 15A and a light receiving unit 15B disposed facing each other. Note that, in FIG. 3, an illustration of the card detection mechanisms 15b, 15c and 15d has been omitted. As shown in FIG. 3, the light emitting unit 15A and the light receiving unit 15B are disposed in a state in which the card conveyance path 7 is sandwiched in the vertical direction.

When there is no card 2 between the light emitting unit 15A and the light receiving unit 15B, the light receiving unit 15B receives light from the light emitting unit 15A. At this time, the card detection mechanisms 15a, 15b, 15c and 15d are in an OFF state. In this state, if a card 2 enters between the light emitting unit 15A and the light receiving unit 15B, the light from the light emitting unit 15A to the light receiving unit 15B is intercepted so that the card detection mechanisms 15a, 15b, 15c and 15d are in the ON state. Therefore, the card detection mechanisms 15a, 15b, 15c and 15d can detect a card 2 by switching from an OFF state to an ON state.

Note that, the card detection mechanisms 15a, 15b, 15c and 15d may be reflection type optical sensors. In this case, when the light receiving unit does not receive light from the light emitting units of the card detection mechanisms 15a, 15b, 15c and 15d, the card detection mechanisms 15a, 15b, 15c and 15d are in the OFF state, thus, if the light receiving unit receives light emitted from the light emitting units of the card detection mechanisms 15a, 15b, 15c and 15d and reflected from the card 2, the card detection mechanisms 15a, 15b, 15c and 15d are in the ON state.

As shown in FIG. 3, the card conveyance mechanism 8 includes three conveyance rollers 26 (refer to FIG. 1. In FIG. 3, only the most front side of the rollers is illustrated) contact with the card 2 to convey the card 2 on the card conveyance path 7, a motor 28 (refer to FIG. 4) for driving each conveyance roller 26, and a power transmission mechanism (not shown) for transmitting the power of the motor 28 to each conveyance roller 26. Each conveyance roller 26 is disposed on the inside of the main body part 6. Namely, the conveyance rollers 26 are disposed to the rear side relative to the card insertion detection mechanism 14. The motor 28 is, specifically, a DC motor.

As shown in FIG. 3, a pad roller 29 is disposed to oppose each conveyance roller 26.

Each conveyance roller 26 and the pad roller 29 are opposed in the vertical direction. Further, the pad roller 29 is biased toward the conveyance roller 26, and the card 2 is conveyed in a state sandwiched between the conveyance roller 26 and the pad roller 29.

An encoder 30 for detecting the rotation of the motor 28 is attached to the motor 28 (refer to FIG. 4). In the present embodiment, it is possible to make the conveyance roller 26 rotate even in a state when the motor 28 is stopped, and if the conveyance roller 26 is rotated in the state when the motor 28 is stopped, the rotation of the motor 28 is detected by the encoder 30. Namely, if the conveyance roller 26 rotates in the state in which the motor 28 is stopped, the rotation of the conveyance roller 26 is detected by the encoder 30. The motor 28 and the encoder 30 are electrically connected to the control unit 17.

The control unit 17 of the card reader 1 shown in FIG. 4 performs overall control of the entirety of the card reader 1, and specifically, contains various processors which execute programs and perform processes, a Random Access Memory (RAM), and a Read Only Memory (ROM). The various processors include a central processing unit (CPU) which is a general-purpose processor functioning as various processing units by executing a program, a programmable logic device (PLD) which is a processor capable of changing a circuit configuration after a field-programmable gate array (FPGA) is manufactured, and a dedicated electric circuit which is a processor having a dedicated circuit configuration designed for performing a specific process such as an Application-Specific Integrated Circuit (ASIC). More specifically, the configuration of each of the various processors is an electrical circuit in which circuit elements, such as semiconductor elements, are combined. The control unit 17 may be configured by one of these various processors, or may be configured by a combination of two or more same or different processors (for example, a combination of a plurality of the FPGAs or the CPU and the FPGA).

The control unit 17 operates each of the motor 28, the shutter driving mechanism 25, and the interference magnetic field generation device 16 by a plurality of drive powers. Specifically, the control unit 17 operates at either a high power mode for operating the motor 28 at a predetermined maximum drive power My (first drive power), or a low power mode for operating the motor 28 at a drive power my lower than the maximum drive power My. Further, the control unit 17 operates at either a high power mode for operating the shutter driving mechanism 25 at the maximum drive power Sv rated in advance for the drive source, or a low power mode for operating the shutter driving mechanism 25 at a drive power sv lower than the maximum drive power Sv. Furthermore, the control unit 17 operates at either a high power mode for operating the interference magnetic field generation device 16 at a maximum drive power Cv (second drive power) set in advance thereof, or a low power mode for operating the interference magnetic field generation device 16 at a drive power cv (third drive power) lower than the maximum drive power Cv.

The control unit 17 controls the voltage supplied to the motor 28 by a combination of Proportional-Integral-Differential control (PID) and PWM control.

When operating the motor 28 in the high power mode, the control unit 17 accelerates the motor 28 until the rotational speed of the motor 28 reaches the target speed, with the duty ratio in PWM control as a first value. When the motor 28 is operated in the low power mode, the control unit 17 rotates the motor 28 at a constant speed so that the rotational speed of the motor 28 is maintained at the target speed with the duty ratio in PWM control as a second value which is lower than the first value.

When operating the shutter driving mechanism 25 in the high power mode, the control unit 17 continuously supplies the maximum voltage that can be supplied to the drive source of the shutter driving mechanism 25. When operating the shutter driving mechanism 25 in the low power mode, the control unit 17 performs pulse width modulation (PWM) control of the voltage supplied to the drive source of the shutter driving mechanism 25.

When operating the interference magnetic field generation device 16 in the high power mode, the control unit 17 continuously supplies the maximum voltage that can be supplied to the coil 16a of the interference magnetic field generation device 16. When operating the interference magnetic field generation device 16 in the low power mode, the control unit 17 continuously supplies a voltage lower than the aforementioned maximum voltage, or, intermittently supplies the maximum voltage to the coil 16a of the interference magnetic field generation device 16.

Specific Example of Operation of Card Reader

Figure 5:
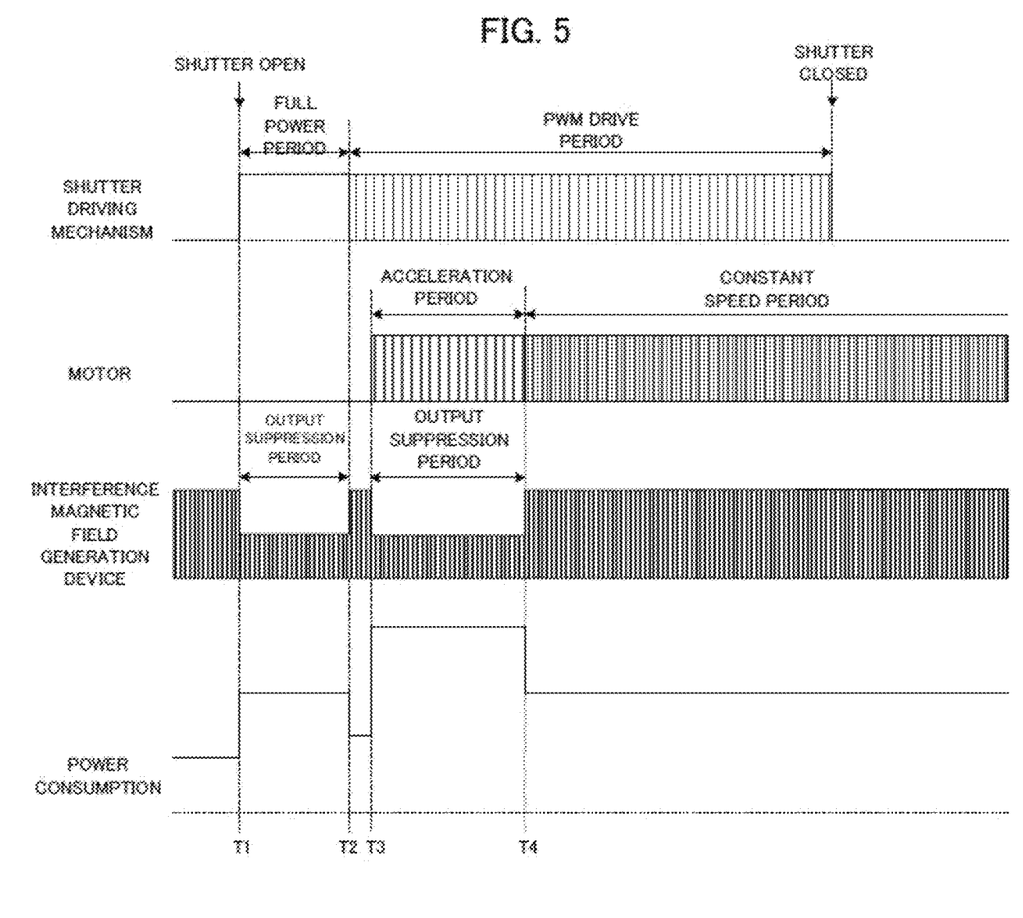
FIG. 5 is a timing chart describing an operational example of the card reader 1.

FIG. 5 is a timing chart describing an operational example of the card reader 1. FIG. 5 shows the operation conditions of the shutter driving mechanism 25, the operation conditions of the motor 28, the operation conditions of the interference magnetic field generation device 16, and the change in the power consumption during operation of the card reader 1.

If the card 2 is inserted in the insertion port 4 and the card 2 is detected by the card insertion detection mechanism 14, the operation shown in FIG. 5 is started. The control unit 17 makes the interference magnetic field generation device 16 operate in the high power mode until the card 2 is detected by the card insertion detection mechanism 14.

First, the control unit 17 operates the shutter driving mechanism 25 in the high power mode at time t1 ("full power period" in the drawing) and switches the operating mode of the interference magnetic field generation device 16 from the high power mode to the low power mode ("output suppression period" in the drawing). The shutter member 13 moves to the open position with a large driving force thereby. In the example of FIG. 5, the voltage of the low power mode of the interference magnetic field generation device 16 to be supplied to the coil 16a is set to a mode lower than the high power mode.

When time t2 which is a short time after time t1 is reached, the control unit 17 operates the shutter driving mechanism 25 in the low power mode ("PWM drive period" in the drawing) and the operating mode of the interference magnetic field generation device 16 switches from a low power mode to a high power mode.

When time t3 which is after time t2 is reached, the control unit 17 operates the motor 28 in the high power mode to accelerate the rotational speed of the motor 28 to the target speed ("acceleration period" in the drawing) and switches the operating mode of the interference magnetic field generation device 16 from the high power mode to the low power mode ("output suppression period" in the drawing).

When the rotational speed of the motor 28 reaches the target speed at time t4 after time t3, the control unit 17 operates the motor 28 in a low power mode to maintain the rotational speed of the motor 28 at the target speed ("constant speed period" in the drawing) and the operating mode of the interference magnetic field generation device 16 switches from a low power mode to a high power mode.

Effect of the Card Reader of the Embodiment

The full power period in FIG. 5 is the period where the shutter driving mechanism 25 is driven at the maximum drive power, thus, the power consumption of the entirety of the card reader 1 becomes high. In the card reader 1, the motor 28 is not driven during this full power period, and further, the interference magnetic field generation device 16 operates in a low power mode. Therefore, the increase of the instantaneous power consumption can be suppressed during this full power period.

Further, the acceleration period in FIG. 5 is the period in which the motor 28 is driven at the maximum drive power, thus, the power consumption of the entirety of the card reader 1 becomes high. In the card reader 1, the shutter driving mechanism 25 operates in the low power mode during this acceleration period, and, the interference magnetic field generation device 16 operates in the low power mode. Therefore, the increase of the instantaneous power consumption can be suppressed during this acceleration period.

Further, according to the card reader 1, the interference magnetic field generation device 16 operates in the high power mode in periods other than the full power period in FIG. 5 and the acceleration period. Therefore, it is possible to generate an interference magnetic field having the highest security during this period, and it is possible to improve the crime prevention performance. Further, the power consumed by the shutter driving mechanism 25 and the motor 28 is low during this period, thus, the crime prevention performance can improve while suppressing the increase of the power consumption.

Modification Example of the Card Reader of the Embodiment

Figure 6:
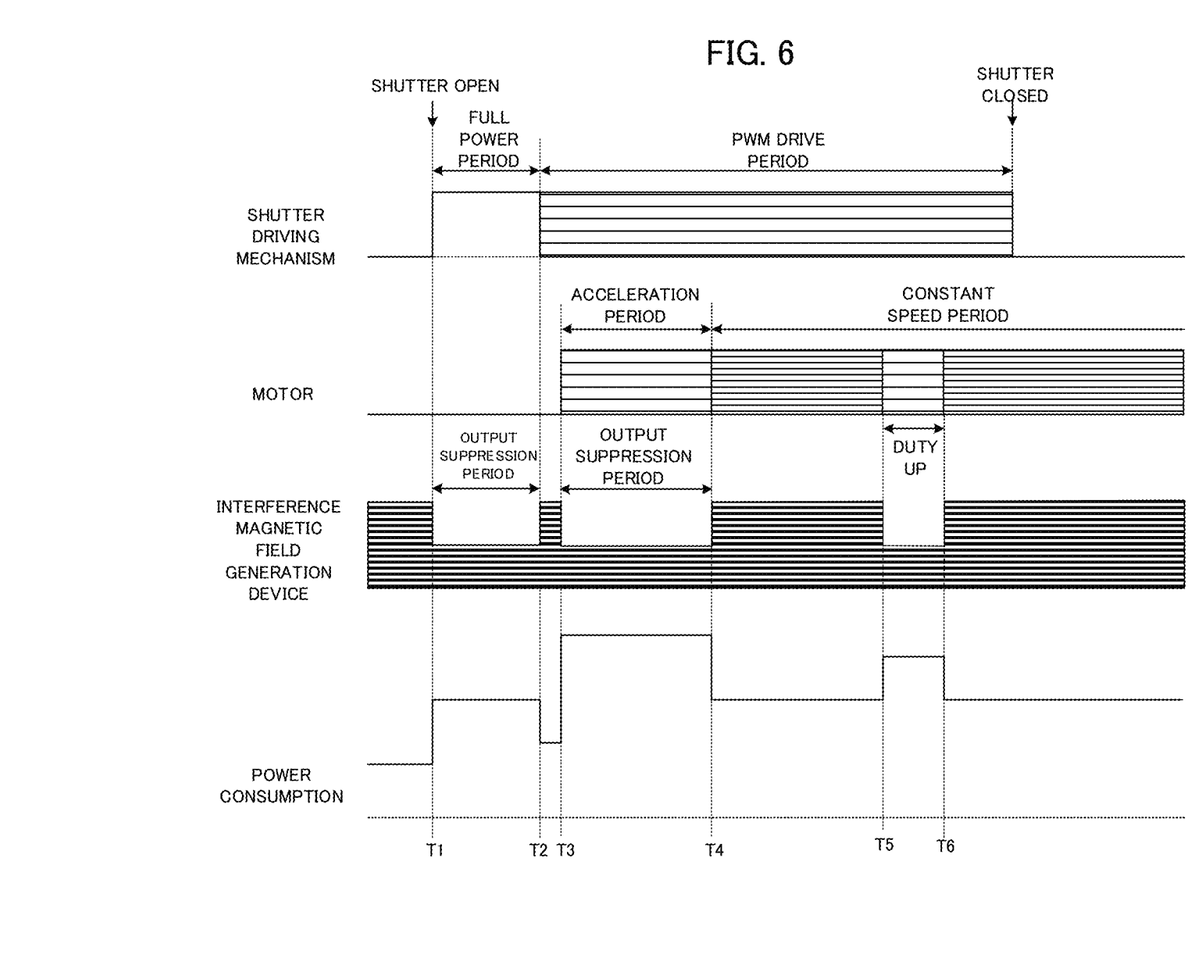
FIG. 6 is a timing chart describing a modification example of the operation of the card reader 1.

FIG. 6 is a timing chart describing a modification example of the operation of the card reader 1.

The operation state of the shutter driving mechanism 25 shown in FIG. 6 is the same as that of FIG. 5. Further, the operations from time t1 to time t4 of FIG. 6 are the same as those in FIG. 5.

After the constant speed period when the rotational speed of the motor 28 is constantly controlled at time t4 is started, if the rotational speed of the motor 28 becomes the threshold or less at time t5, and thus, is reduced significantly compared to the target speed, the control unit 17 performs a control to temporarily increase the duty ratio of the PWM control of the motor 28 in order to return the rotational speed to the target speed ("Duty UP" in FIG. 6).

If the control unit 17 performs the control which increased the duty ratio at time t5, the operating mode of the interference magnetic field generation device 16 switches from the high power mode to the low power mode. Moreover, when this control is terminated at time t6 and the duty ratio of the PWM control of the motor 28 returned to the original value, the control unit 17 switches the operating mode of the interference magnetic field generation device 16 from the low power mode to the high power mode. Note that, the drive power of the motor 28 from the time t5 to the time t6 is higher than the drive power during the constant speed period, and is controlled to the drive power or less during the acceleration period.

According to the operation example shown in FIG. 6, when the rotational speed of the motor 28 decreases due to card jamming or card grabbing, and the like, and the drive power of the motor 28 becomes high so as to try to return the rotational speed to the target speed, the interference magnetic field device 16 operates with a low drive power. Therefore, it is possible to prevent an increase of the power consumption when card jamming or card grabbing and the like occurs.

OTHER MODIFICATION EXAMPLES

The interference magnetic field generation device 16 is not necessary in the card reader 1. Alternatively, the control unit 17 may be controlled so as to operate the interference magnetic field generation device 16 only in the high power mode. Even with these configurations, the period in which the motor 28 operates in the high power mode and the period in which the shutter driving mechanism 25 operates in the high power mode do not overlap, thus, the increase of the instantaneous power consumption can be suppressed in the entirety of the card reader 1.

The card reader 1 automatically conveys the card by driving the conveyance roller 26 with the motor 28, but the motor 28 is not necessary as long as the card reader is of a type in which the card 2 is pushed manually. Even with this configuration, the period in which the shutter driving mechanism 25 operates in the high power mode and the period in which the interference magnetic field generation device 16 operates in the high power mode do not overlap, thus, the increase of the instantaneous power consumption can be suppressed in the entirety of the card reader 1.

The control unit 17 may operate the interference magnetic field generation device 16 in the high power mode during the acceleration period shown in FIG. 5. Even in this case, the period in which the shutter driving mechanism 25 operates in the high power mode and the period in which the interference magnetic field generation device 16 operates in the high power mode do not overlap, thus, the increase of the instantaneous power consumption can be suppressed in the entirety of the card reader 1.

The control unit 17 may operate the interference magnetic field generation device 16 in the high power mode during the full power period shown in FIG. 5. Even in this case, the period in which the motor 28 operates in the high power mode and the period in which the interference magnetic field generation device 16 operates in the high power mode do not overlap, thus, the increase of the instantaneous power consumption can be suppressed in the entirety of the card reader 1.

The control unit 17 may be controlled so that the full power period shown in FIG. 5 and the acceleration period partially overlap. Even in this case, the increase of the instantaneous power consumption can be suppressed in the entirety of the card reader 1 by performing a control to operate the interference magnetic field generation device 16 at a low power mode in the period in which the shutter driving mechanism 25 is operated at a high power mode, performing a control to operate the interference magnetic field generation device 16 at a low power mode in the period in which the motor 28 is operated at a high power mode, or performing both controls.

Up to this point, the shutter driving mechanism 25, the motor 28, and the interference magnetic field generation device 16 were exemplified as units in which the power consumption in the card reader 1 is large and having overlapping operation periods. However, as such a unit, other options (for example, a card lock mechanism) which can be attached to, for example, the magnetic head 24, the IC contact block 12, or the card reader 1 can be considered, and these options can prevent the increase of the instantaneous power consumption by controlling the operation of each unit so that the periods in which the increase of the instantaneous power consumption is maximum do not overlap.

As described above, this specification discloses the following content.

(1)

A card reader which reads information recorded on a card, the card reader comprising:

a plurality of units having overlapping operation periods; and a control unit structured to operate each of the plurality of units by a plurality of drive powers, wherein the control unit controls the plurality of units so that the periods in which the drive powers of the plurality of units are maximum do not overlap.

According to (1), the plurality of units are controlled so that the periods in which the drive powers of the plurality of units are maximum do not overlap, thus, the increase of the instantaneous power consumption can be prevented.

(2)

The card reader according to (1), wherein the plurality of units are operated when an insertion of the card is detected.

According to (2), the unit operating when the card is inserted has a large power consumption, thus, a remarkable suppression effect of the maximum power consumption can be obtained.

(3)

The card reader according to (1), wherein the plurality of units are at least two among a shutter driving mechanism structured to drive a shutter member structured to close a conveyance path of the card, a motor structured to drive a conveyance roller structured to convey the card, and an interference magnetic field generation device structured to generate an interference magnetic field.

According to (3), the shutter driving mechanism, the motor for conveyance, and the interference magnetic field generation device have a large power consumption, thus, a remarkable suppression effect of the maximum power consumption can be obtained.

(4)

The card reader according to (3), wherein the plurality of units comprise the shutter driving mechanism and the motor, and when the insertion of the card is detected, the control unit operates the shutter drive mechanism at a maximum drive power and then operates the shutter drive mechanism at a drive power which is lower than the maximum drive power, and accelerates the motor to a target speed at a first drive power during a period in which the shutter driving mechanism is operated at the drive power which is lower than the maximum drive power, and then rotates the motor at a constant speed at a drive power lower than the first drive power.

According to (4), in the initial stage of moving the shutter member to the open position, the shutter drive mechanism operates at a high drive power, and thereafter, the shutter drive mechanism operates at a low drive power. The acceleration of the motor is performed during the period in which shutter driving mechanism is operating at a low drive power, and thereafter, the motor rotates at a constant speed. Therefore, a control is performed so that the period in which the drive power of the shutter driving mechanism is maximum and the period in which the drive power of the motor is maximum do not overlap, thus, the increase of the instantaneous power consumption can be prevented when the card is inserted.

(5)

The card reader according to (4), wherein the plurality of units further comprise the interference magnetic field generation device, and the control unit operates the interference magnetic field generation device at a second drive power during each of the first period in which the shutter driving mechanism is operated at the maximum drive power and the second period in which the motor is operated at the first drive power, and operates the interference magnetic field generation device at a third drive power which is greater than the second drive power during a period other than the first period and the second period.

According to (5), the drive power of the interference magnetic field generation device is controlled to be low during the first period and the second period. Therefore, the increase of the instantaneous power consumption can be prevented when the card is inserted. Further, during periods other than the first period and the second period, the interference magnetic field generation device is operated at a drive power, thus, the crime prevention effect can be increased.

(6)

The card reader according to (5), wherein the control unit operates the interference magnetic field generation device at the second drive power when the rotational speed of the motor becomes a threshold or less during a period in which the motor is operated at a drive power lower than the first drive power.

According to (6), when the rotational speed of the motor decreases due to card jamming or card grabbing, and the like, and the drive power of the motor increases to return the rotational speed to the target value, the interference magnetic field generation device is operated at a low drive power. Therefore, it is possible to prevent an increase of the power consumption when card jamming or card grabbing and the like occurs.

(7)

A control method of a card reader which reads information recorded on a card, the control method comprising:

a control step of operating, at a plurality of drive powers, each of a plurality of units mounted on the card reader and having overlapping operation periods, wherein the control step controls the plurality of units so that the periods in which the drive powers of the plurality of units are maximum do not overlap.

What is claimed is:

1. A card reader which reads information recorded on a card, the card reader comprising:

a plurality of units having overlapping operation periods; and a control unit structured to operate each of the plurality of units by a plurality of drive powers, wherein the control unit is configured to control the plurality of units so that periods in which the drive powers of each of the plurality of units are maximum do not overlap.

2. The card reader according to claim 1, wherein the plurality of units are operated when an insertion of the card is detected.

3. The card reader according to claim 2, wherein the plurality of units comprise at least two of: a shutter driving mechanism structured to drive a shutter member structured to close a conveyance path of the card, a motor structured to drive a conveyance roller structured to convey the card, and an interference magnetic field generation device structured to generate an interference magnetic field.

4. The card reader according to claim 3, wherein the plurality of units comprise the shutter driving mechanism and the motor, and the control unit is configured such that, when the insertion of the card is detected, the control unit operates the shutter drive mechanism at a maximum drive power and then operates the shutter drive mechanism at a drive power which is lower than the maximum drive power, and accelerates the motor to a target speed at a first drive power during a period in which the shutter driving mechanism is operated at the drive power which is lower than the maximum drive power, and then rotates the motor at a constant speed at a drive power lower than the first drive power.

5. The card reader according to claim 4, wherein the plurality of units further comprise the interference magnetic field generation device, and the control unit is configured to operate the interference magnetic field generation device at a second drive power during each of the first period in which the shutter driving mechanism is operated at the maximum drive power and the second period in which the motor is operated at the first drive power, and operate the interference magnetic field generation device at a third drive power which is greater than the second drive power during a period other than the first period and the second period.

6. The card reader according to claim 5, wherein the control unit is configured to operate the interference magnetic field generation device at the second drive power when the rotational speed of the motor becomes a threshold or less during a period in which the motor is operated at a drive power lower than the first drive power.

7. The card reader according to claim 1, wherein the plurality of units comprise at least two of: a shutter driving mechanism structured to drive a shutter member structured to close a conveyance path of the card, a motor structured to drive a conveyance roller structured to convey the card, and an interference magnetic field generation device structured to generate an interference magnetic field.

8. The card reader according to claim 7, wherein the plurality of units comprise the shutter driving mechanism and the motor, and the control unit is configured such that, when the insertion of the card is detected, the control unit operates the shutter drive mechanism at a maximum drive power and then operates the shutter drive mechanism at a drive power which is lower than the maximum drive power, and accelerates the motor to a target speed at a first drive power during a period in which the shutter driving mechanism is operated at the drive power which is lower than the maximum drive power, and then rotates the motor at a constant speed at a drive power lower than the first drive power.

9. The card reader according to claim 8, wherein the plurality of units further comprise the interference magnetic field generation device, and the control unit is configured to operate the interference magnetic field generation device at a second drive power during each of the first period in which the shutter driving mechanism is operated at the maximum drive power and the second period in which the motor is operated at the first drive power, and operate the interference magnetic field generation device at a third drive power which is greater than the second drive power during a period other than the first period and the second period.

10. The card reader according to claim 9, wherein the control unit is configured to operate the interference magnetic field generation device at the second drive power when the rotational speed of the motor becomes a threshold or less during a period in which the motor is operated at a drive power lower than the first drive power.

11. A control method of a card reader which reads information recorded on a card, the control method comprising:

a control step comprising operating, at a plurality of drive powers, each of a plurality of units mounted on the card reader and having overlapping operation periods, wherein the control step controls the plurality of units so that the periods in which the drive powers of the plurality of units are maximum do not overlap.

* * * * *